United States Patent [19]

Ziegler

[11] Patent Number: 5,034,766
[45] Date of Patent: Jul. 23, 1991

[54] MIRROR ASSEMBLY FOR A SMALL AND MEDIUM FORMAT COPY CAMERA

[76] Inventor: William R. Ziegler, 417 Shirley Way, Menlo Park, Calif. 94025

[21] Appl. No.: 229,342

[22] Filed: Aug. 5, 1988

[51] Int. Cl.$^5$ .............................................. G03B 11/00
[52] U.S. Cl. ...................................................... 354/295
[58] Field of Search ................ 354/81, 189, 153, 220, 354/122, 295, 296; 356/138, 153; 33/281, 286; 350/318; 355/18, 39, 75

[56] References Cited

U.S. PATENT DOCUMENTS

| | | | |
|---|---|---|---|
| 1,992,068 | 2/1935 | Gwozdecki | 354/220 |
| 2,701,501 | 2/1955 | Cuny | 356/153 |
| 3,825,938 | 7/1974 | Koch | 354/189 X |
| 4,311,364 | 1/1982 | Motomura et al. | 350/318 |
| 4,733,257 | 3/1988 | Ziegler | 354/189 |

OTHER PUBLICATIONS

"Spiratone's Bicentenial Sale Lenses, Camera and Darkroom Accessories" catalog 1976, p. 12.
Hasselblad, "Linear Mirror Unit" (Instructions).

*Primary Examiner*—Brian W. Brown
*Attorney, Agent, or Firm*—Flehr, Hohbach, Test, Albritton & Herbert

[57] ABSTRACT

A mirror assembly forming part of an overall arrangement for insuring that the lens of a camera supported by a tripod or the like is parallel with a flat surface supporting an object to be photographed is disclosed herein. This mirror assembly includes a mirror member having a mirrored body including a mirrored surface and a view hole through its mirrored body and mirrored surface. It also includes means for connecting the mirror member to the camera. One such means comprises a T-mount designed to temporarily replace the lens. Another means utilizes a combination of an adaptor ring and a retaining ring. Still another means utilizes the adaptor ring alone.

7 Claims, 2 Drawing Sheets

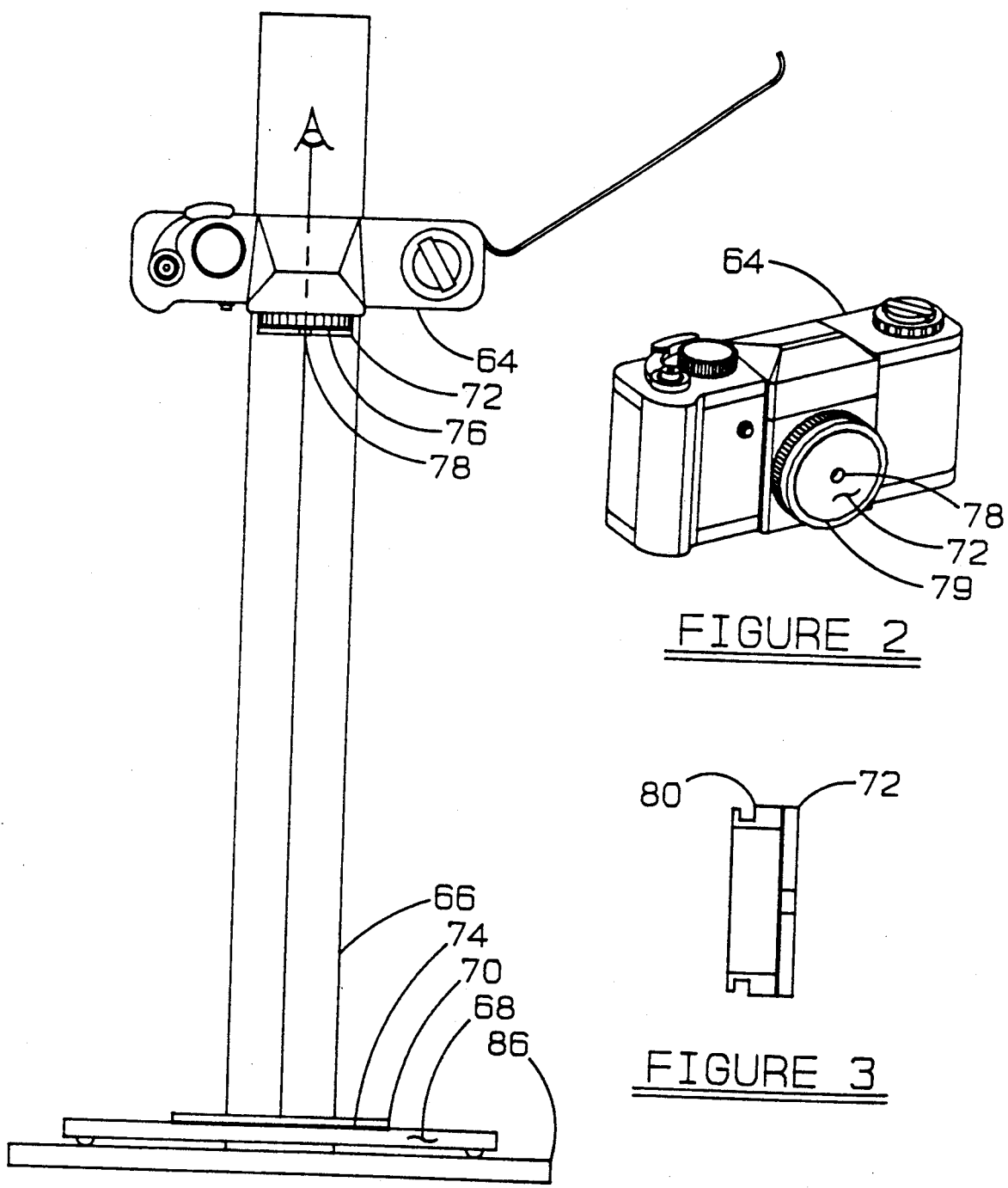

MIRROR ASSEMBLY FOR A SMALL AND MEDIUM FORMAT COPY CAMERA

The present invention relates generally to alignment techniques for photographic equipment, and more particularly to a specifically designed mirror assembly forming part of an overall arrangement for insuring the lens of a small format camera, for example, a 35 mm camera, and/or a medium format camera, for example 2.25 camera, supported by a tripod or the like, is parallel with a flat surface which serves to support an object, typically flat, to be photographed.

The present invention is an extension of the principles relied upon in Applicant's recently issued U.S. Pat. No. 4,733,257 which is incorporated herein by reference. In that patent, a technique for aligning (making parallel) the lens and film planes of a view camera is disclosed. That technique uses a pair of mirror members, each having a mirror body including its own mirrored surface. A first one of the mirror members is configured to fit within the film standard of the view camera in lieu of a film holder so that its mirrored surface faces the lens standard of the camera and coincides or substantially coincides with the camera's film plane. The second mirror member is configured to replace temporarily the camera's lens and lens board which is within its lens standard so that the second mirrored surface faces the film standard and first mirrored surface and coincides with the camera's lens plane. In addition, the second mirror member includes a view hole through its mirror body and mirrored surface so that the two mirrored surfaces can be viewed from outside the lens standard. At the same time, certain specific indicia is provided on at least one of the mirrored surfaces such that when the mirrored surfaces are viewed through the view hole of the second mirror member from outside the lens standard, the indicia will take only one of many different forms if the two mirrored forms are parallel. In this way, as the indicia is viewed, the lens and/or film standards can be adjusted to cause the indicia to take on the one particular form, thereby insuring that the mirrored surfaces, and therefore the lens and film planes, are indeed parallel.

Applicant has not only found it important to align view cameras in the manner described in his U.S. Pat. No. 4,7233,257, but he has also found it to be quite important to accurately align (make parallel) certain planes of an enlarger apparatus as described in his copending application Ser. No. 228,991, filed on the same date as this application and entitled AN ALIGNMENT TECHNIQUE FOR A PHOTOGRAPHIC ENLARGER (Attorney Docket A-47742). This latter application is incorporated herein by reference.

Applicant's copending application just recited provides a detailed description of an alignment arrangement especially suitable for use with a photograph enlarger apparatus to insure parallel relationships between the negative and lens planes of an enlarger head assembly and the easel forming parts of the overall apparatus. However, neither this particular arrangement nor the arrangement illustrated in Applicant's issued patent by themselves are able to align a 35 mm (small format) camera, 2.25 (medium format) camera, or the like with a flat surface supporting an object (typically flat) to be photographed. In fact, if the object being photographed is flat, it could defint the flat surface. More specifically, it is sometimes desirable to support these small and medium format or like cameras on a tripod and photograph a flat object, for example, a painting, or an object on a flat surface. To do so accurately, it is important that the lens plane of the camera be parallel with the flat object or surface. The technique to accomplish this has been suggested by the Victor Hasselblad Company of Goenberg, Sweden, as set forth in a sheet of instructions issued by that company.

The Hasselblad alignment assembly shown in that sheet of instructions is used, ostensibly, to place the film plane of a camera in parallel relationship with a flat surface. To that end, an object mirror is placed on the object plane, that is, in the plane of the subject, and a camera mirror containing an aperture and indicia replaces the camera lens. Thereafter, the back of the camera is removed and from that vantage point, the operator looks at the object mirror through a hole in the camera mirror in order to align the object plane with the lens plane. A drawback to this arrangement is that the mounting means for the camera mirror is custom made for the Hasselblad camera, and is relatively expensive.

In view of the foregoing, it is a further object of this invention to provide an uncomplicated and economical camera mirror for use in a Hasselblad type arrangement.

A more specific object of this invention is to provide a camera mirror or actually a mirror assembly which may be readily mounted to different types of cameras without requiring customized mounting means, either temporarily replacing the camera lens or being mounted directly to the lens.

As will be described in more detail hereinafter, the camera mirror or mirror assembly disclosed herein is one which forms part of an overall arrangement for insuring that a camera supported by, for example, a tripod or the like is parallel with a flat surface supporting an object (copy) to be photographed. The camera mirror or mirror assembly includes a mirror member having a mirror body including a mirrored surface and a view hole through its mirror body and its mirrored surface. This latter mirror assembly may be identical to a corresponding one described in Applicant's Patent No. 4,733,257 or his above-recited copending application.

In accordance with one embodiment of the present invention the assembly includes a commercially available T-mount designed to engage with the lens opening of the camera body after the camera lens has been removed and means for securing the back surface of the mirror member to the front face of the T-mount such that when the T-mount is in the lens opening of the camera body, an individual can see through the view hole of the mirror member from the back of the camera when the back is open.

In accordance with a second embodiment of the present invention, the lens of the camera does not have to be removed at all. Rather, the mirror member is mounted within a ring assembly, for example a Tiffen assembly of the type which normally contains a filter, specifically an assembly including an adapter ring and a retaining ring. In this way, the adapter ring can be mounted directly to the lens of the camera in the usual manner, thereby placing the mirror member directly in front of it. As a result, the back of the camera does not have to be opened. In accordance with a modification to this latter embodiment, the retaining ring is dispensed with all together and the mirror member is mounted directly to the adapter. In accordance with another modification to this embodiment, the mirror member is bonded to the front face of the retaining ring which is then mounted to the camera on the adapter ring, rather than between the retaining ring and the adapter ring.

The various inventive aspects of the present application will be described in more detail hereinafter in conjunction with the drawings, wherein:

FIG. 1 is a front elevational view of a small format (35 mm) camera or a medium format (2.25) camera, or like camera with its lens removed, supported in a tripod fashion, and in combination with an alignment arrangement including a specific mirror assembly designed in accordance with one embodiment of the present invention;

FIG. 2 is a front perspective view of the camera illustrated in FIG. 1 in combination with the mirror assembly which is shown mounted to the camera in place of its lens;

FIG. 3 is a cross sectional view of the mirror assembly shown in FIG. 2;

Figure 4:
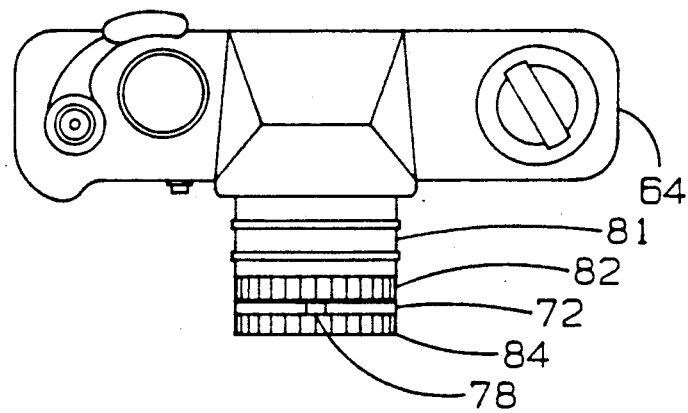
FIG. 4 is a top elevational view of the same camera shown in FIG. 1, without its lens removed and in combination with a mirror assembly design in accordance with a second embodiment of the present invention.

Turning to FIGS. 1-3, attention is directed to one embodiment of an alignment arrangement for use with a standard 35 mm camera or like camera, for photographing flat copy. To this end, the camera, which is generally indicated at 64, is supported on a tripod or like support means 66 for photographing flat copy 68. In order to insure that the copy is appropriately photographed, it is important that the lens plane of the camera and the copy be parallel. As will be seen below, Applicant has provided an alignment arrangement for meeting this objective.

The alignment arrangement associated with camera 64 includes a first mirror member 70 which may be identical to the mirror member 26 described in Applicant's above recited copending application, and a second mirror member 72 which may be identical to the mirror member 28 described in the latter copending application. Mirror member 70 includes a mirror body having a mirrored surface 74 and mirror member 72 includes a mirror body having a mirrored surface 76 and a view hole 78 as well as a concentric circle 79 or other such indicia around the hole.

In order to align the lens plane of camera 64 with copy 68, the mirror member 70 is temporarily located on the copy so that its mirrored surface 74 faces upward, directly beneath the camera 64. Mirror member 72 is temporarily mounted to the camera in place of the camera's lens which is first removed. Mirror member 72 is mounted so that its mirrored surface 76 faces downward directly over mirrored surface 74. In this way, the mirror member is located within the lens plane of the camera and the mirrored surfaces can be viewed through view hole 78 from above the camera when the camera's back is open, as illustrated in FIG. 1. Since, mirror member 72 includes a concentric circle 79 around its view hole 78, the camera can be adjusted to insure that the lens plane is parallel with the copy 68 in the manner described in the previously recited copending application and Applicant's issued patent.

This alignment approach described immediately above is similar to one suggested by Hasselblad, as discussed previously. However, in accordance with the present invention, the mirror member 72 is readily disengageably mountable to the camera 64, in place of its lens, by means of a commercially available, standard T-mount 80, as illustrated in FIG. 2. This T-mount is bonded or otherwise suitably fixedly connected to mirror member 72 across its backside. In this way, the mirror member 72 can be readily disengageably mounted on camera 64 without requiring any customized mounting means. Like mirror members 26 and 28, mirror members 70 and 72 can include indicia other than concentric rings to provide appropriate alignment between the mirrored surfaces.

Figure 5:
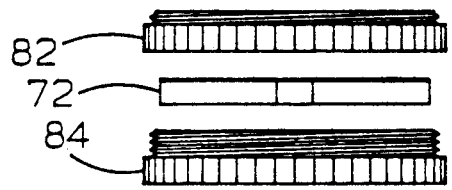
FIG. 5 is an exploded top elevational view of the mirror assembly of FIG. 4.

In the embodiment just described, it was necessary to remove the lens from camera 64 in order to connect the T-mount and mirror member 72 thereto. In FIG. 4, the camera 64 is shown with its lens 81 mounted to the camera. In this embodiment, mirror member 72 is mounted between an adaptor ring 82 and a retainer ring 84 which together form part of an overall Tiffen or like assembly. The assembly which is best illustrated in FIG. 5 is, in turn, mounted directly to lens 81, as shown in FIG. 4. In this way, the camera does not have to be opened at its back end. Rather, the operator can look through opening 78 in mirror member 72 by viewing through the lens from the back of the camera. While this is, in many respects, more convenient than the embodiment illustrated in FIGS. 1-3, it does place limitations on the size of opening 78, as will be discussed hereinafter.

A particular advantage to the Tiffen type of assembly illustrated in FIG. 4 and 5 over the T-mount shown in FIGS. 1-3, is that the latter is only available for 35 mm cameras and is not available on 2.25 (medium format) cameras. At the same time, unless the mirror member 72 is made thick enough, that is, as thick as a filter intended for use in the Tiffen type of assembly, it tends to rattle between its adaptor ring and its retaining ring. As will be seen below, thus problem is eliminated by the embodiments illustrated in FIGS. 6 and 7.

Figure 6:
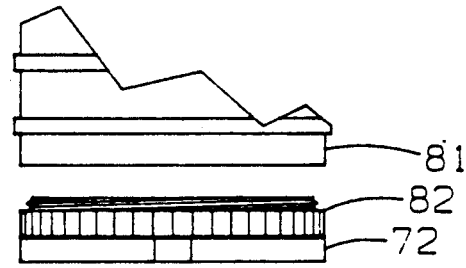
FIG. 6 is an exploded top elevational view illustrating the lens of the camera shown in FIG. 4 in combination with a mirror assembly designed in accordance with still another embodiment of the present invention.
Figure 7:
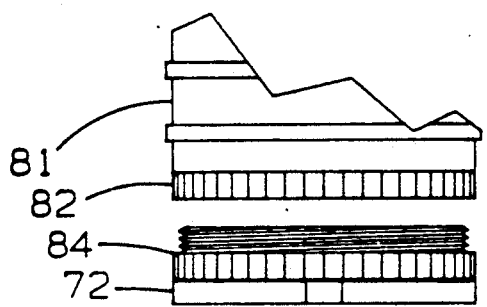
FIG. 7 is a view similar to FIG. 6 but illustrating a mirror assembly designed in accordance with a third embodiment of the present invention.

Turning to FIG. 6, mirror member 72 is shown bonded or otherwise suitably connected to the front face of adaptor ring 82 which, in turn, is readily mountable onto lens 81. In the embodiment shown in FIG. 7, the mirror member is bonded or otherwise suitably connected to the front face of retaining ring 84. The retaining ring is then readily mountable to the adaptor ring which, in turn, is shown in FIG. 7 mounted to lens 81. Because the size of the adaptor ring depends upon the size of the lens it is connected to, the embodiment illustrated in FIG. 6 is particularly advantageous if the size of the customer's lens is known. If it is, mirror member 72 can be mounted directly to an appropriately sized adaptor ring. On the other hand, if it is not, then the embodiment illustrated in FIG. 7 is especially appropriate. In this embodiment, the mirror member is mounted directly to the retaining ring which is not dependent in size on the size of the lens or the adaptor ring. Each size of retaining ring fits a wide range of adaptor rings. All the customer need do is obtain a particular adaptor ring for his specific lens and then mount the combination retaining ring/mirror member to it.

In each of these latter three embodiments, the mirror member 72 is viewed directly through the lens of the camera in order to align the camera with the object being copied, as described in conjunction with FIG. 1. As may be recalled from both applicant's previously recited copending application and his recently issued United States Patent, this requires visually observing whether the concentric ring on mirror member 72 lines up concentrically or not with its view hole. Therefore, the opening 78 must be sufficiently large to pass enough light through the camera lens. At the same time, the size of this opening depends upon the focal length and F-stop of a particular camera, which vary from camera to camera. As the focal length increases, a larger aperture is required for a given F-stop. However, applicant does not contemplate providing mirror members having different sizes for camera displaying different focal lengths. On the other hand, if the view hole is too large, it adversely affects the accuracy of the alignment procedure. Applicant has determined that a mirror member designed specifically for a maximum focal length of 110 and an F-stop of 11 would adequately cover most members. A view hole of the mirror member designed to meet this criteria would display a diameter of 10 mm. It is to be understood that the present invention is not limited to this particular embodiment.

Figure 8:
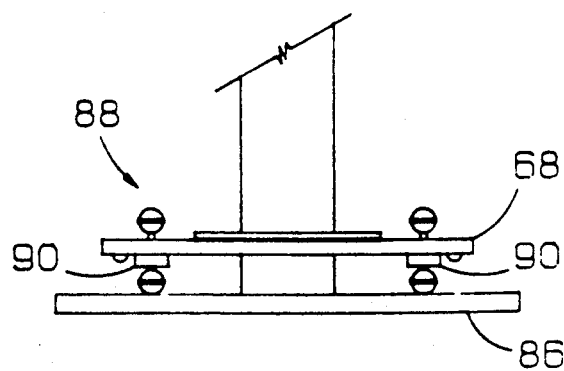
FIG. 8 illustrates, in part, a support as shown in FIG. 1 in combination with an easel adjustment assembly of the type described in applicant's previously recited copending patent application.

Returning to FIG. 1, the copy 68 being photographed is shown supported on a flat baseboard 86. Any adjustments that are necessary to make the camera parallel with the copy are typically made at the camera and not at the baseboard. In FIG. 8, the copy 68 is shown supported on an alignment assembly 88 which is identical to an easel alignment assembly described in detail in applicant's previously recited copending application. As discussed there, this assembly includes a pair of alignment bars indicated at 90 in FIG. 8. Each of these alignment bars includes adjustment mechanisms at opposite ends thereof, whereby each end of each alignment bar can be raised or lowered relative to baseboard 86. In that way, if it necessary to make an adjustment between camera 64 and copy 68, it can be done at the camera and/or at the copy.

While copy has been shown photographed vertically, i.e., with the object on the floor, it is to be understood that the object can be photographed horizontally, i.e., on the wall such as a painting, or at any other angle.

What is claimed:

1. An alignment arrangement for use with a camera including a camera lens and means for supporting the camera for taking a photograph of a flat surface, whereby said camera can be adjustably positioned in parallel relationship with said flat surface, said alignment arrangement comprising:
   (a) a first mirror member having a mirrored body including a mirrored surface, said first mirror member being configured to lie on said flat surface such that its mirrored surface faces said camera;
   (b) a mirror assembly including an adaptor ring and a retaining ring thread connected together with a second mirror member having a mirrored body including a mirrored surface and view hole, approximately 10 mm in diameter, through its mirrored body and mirrored surface, said secured mirror member being positioned between the adaptor ring and the retaining ring, said mirror assembly being thread mounted to the lens of said camera so that said second mirrored surface faces said flat surface and said first mirrored surface and so that both mirrored surfaces can be viewed through said view hole in said second mirrored member through the lens of the camera; and
   (c) indicia on at least one of said mirrored surfaces such that when said mirrored surfaces are viewed through said view hole, said indicia will take only one of many different forms if the two mirrored surfaces are parallel, whereby said camera can be adjusted to provide said one form in order to insure that said camera lens is parallel with said flat surface.

2. An alignment arrangement for use with a camera including a camera lens and means for supporting the camera for taking a photograph of a flat surface, whereby said camera can be adjustably positioned in parallel relationship with said flat surface, said alignment arrangement comprising:
   (a) a first mirror member having a mirrored body including a mirrored surface, said first mirror member being configured to lie on said flat surface such that its mirrored surface faces said camera;
   (b) an adaptor ring disengageably thread mounted to the lens of said camera and a second mirror member having a mirrored body including a mirrored surface and a view hole, approximately 10 mm in diameter, through its mirrored body and mirrored surface, said second mirror member being fixedly bonded by means of adhesive to said adaptor ring so that said second mirrored surface faces said flat surface and said first mirrored surface and so that both mirrored surfaces can be viewed through said view hole in said second mirror member from the back of said camera; and
   (c) indicia on at least one of said mirrored surfaces such that when said mirrored surfaces are viewed through said view hole, said indicia will take only one of many different forms if the two mirrored surfaces are parallel, whereby said camera can be adjusted to provide said one form in order to insure that said camera lens is parallel with said flat surface.

3. An alignment arrangement for use with a camera including a camera lens and means for supporting the camera for taking a photograph of a flat surface, whereby said camera can be adjustably positioned in parallel relationship with said flat surface, said alignment arrangement comprising:
   (a) a first mirror member having a mirrored body including a mirrored surface, said first mirror member being configured to lie on said flat surface such that its mirrored surface faces said camera;
   (b) an adaptor ring disengageably thread mounted to the lens of said camera, a retaining ring disengageably thread mounted directly to said adaptor ring, and a second mirror member having a mirrored body including a mirrored surface and a view hole, approximately 10 mm in diameter, through its mirrored body and mirrored surface, said second mirror member being fixedly bonded by means of adhesive to said retaining ring so that said second mirrored surface faces said flat surface and said first mirrored surface, and so that both mirrored surfaces can be viewed through said view hole in said second mirror member from the back of said camera; and (c) indicia on at least one of said mirrored surfaces such that when said mirrored surfaces are viewed through said view hole, said indicia will take only one of many different forms if the two mirrored surfaces are parallel, whereby said camera can be adjusted to provide said one form in order to insure that said camera lens is parallel with asid flat surface.

4. A mirror assembly forming part of an overall arrangement for insuring that the lens of a camera supported by a tripod or the like is parallel with a flat surface to be photographed, said mirror assembly comprising:

(a) an adaptor ring disengageably thread mountable to the lens of a camera;

(b) a retaining ring disengageably thread mountable to said adaptor ring; and (c) a mirror member having a mirrored body including a mirrored surface and view hole, approximately 10 mm in diameter, through its mirrored body and mirrored surface, said mirror member being located between and within said adaptor ring and retaining ring.

5. A mirror assembly forming part of an overall arrangement for insuring that the lens of a camera supported by a tripod or the like is parallel with a flat surface to be photographed, said mirror assembly comprising:

(a) an adaptor ring disengageably thread mountable to the lens of a camera; and (b) a mirror member having a mirrored body including a mirrored surface and a view hole, approximately 10 mm in diameter, through its mirrored body and mirrored surface, said mirror member being fixedly bonded by means of adhesive to the front face of said adaptor ring.

6. A mirror assembly forming part of an overall arrangement for insuring that the lens of a camera supported by a tripod or the like is parallel with the flat surface to be photographed, said mirror assembly comprising:

(a) an adaptor ring disengageably thread mountable to the lens of a camera;

(b) a retaining ring disengageably thread mountable to said adaptor ring; and (c) a mirror member having a mirrored body including a mirrored surface and a view hole, approximately 10 mm in diameter, through its mirrored body and mirrored surface, said mirror member being bonded to the front face of said retaining ring.

7. An alignment arrangement for use with a camera including a camera lens having a particular focal length and means for supporting the camera for taking a photograph of a flat surface, whereby said camera can be adjustably positioned in parallel relationship with said flat surface, said alignment arrangement comprising:

(a) a first mirror member having a mirrored body including a mirrored surface, said first mirror member being configured to lie on said flat surface such that its mirrored surface faces said camera;

(b) a mirror assembly including a second mirror member having a mirrored body including a mirrored surface and view hole through its mirrored body and mirrored surface, and means for thread mounting said second mirror member to the lens of said camera so that said second mirrored surface faces said flat surface and said first mirrored surface and so that both mirrored surfaces can be viewed through said view hole in said second mirrored member through the lens of the camera; and (c) indicia on at least one of said mirrored surfaces such that when said mirrored surfaces are viewed through said view hole, said indicia will take only one of many different forms if the two mirrored surfaces are parallel, whereby said camera can be adjusted to provide said one form in order to insure that said camera lens is parallel with said flat surface;

(d) said view hole being large enough depending, on the focal length of said lens, to allow sufficient light through the lens in order for the viewer to see said indicia and small enough to accurately distinguish between said one indicia form and all others.

* * * * *